United States Patent
Shoemaker

(10) Patent No.: US 12,438,626 B2
(45) Date of Patent: Oct. 7, 2025

(54) RECEIVER TEST APPARATUS AND METHOD

(71) Applicant: Associated Universities, Inc., Washington, DC (US)

(72) Inventor: Kevin Owen Shoemaker, Mineral, VA (US)

(73) Assignee: Associated Universities, Inc., Washington, DC (US)

( * ) Notice: Subject to any disclaimer, the term of this patent is extended or adjusted under 35 U.S.C. 154(b) by 370 days.

(21) Appl. No.: 18/298,555

(22) Filed: Apr. 11, 2023

(65) Prior Publication Data

US 2023/0403088 A1    Dec. 14, 2023

Related U.S. Application Data

(60) Provisional application No. 63/352,122, filed on Jun. 14, 2022.

(51) Int. Cl.
H04B 17/00 (2015.01)
H04B 17/29 (2015.01)

(52) U.S. Cl.
CPC .................................. H04B 17/294 (2023.05)

(58) Field of Classification Search
CPC ................................................... H04B 17/294
USPC .................................................... 455/226.1
See application file for complete search history.

(56) References Cited

U.S. PATENT DOCUMENTS

| | | | | |
|---|---|---|---|---|
| 6,208,248 B1* | 3/2001 | Ross | ................... | G01S 13/0209 340/552 |
| 7,570,132 B1* | 8/2009 | Carlson | ................. | H04Q 1/145 361/768 |
| 2005/0053118 A1* | 3/2005 | Stephan | ............... | G01K 11/006 374/149 |
| 2006/0221741 A1* | 10/2006 | Jain | ................... | G11C 11/40626 374/E7.043 |
| 2007/0211548 A1* | 9/2007 | Jain | ..................... | G06F 11/3058 365/211 |
| 2010/0121318 A1* | 5/2010 | Hancock | .............. | A61B 5/0507 342/174 |
| 2014/0107638 A1* | 4/2014 | Hancock | ................ | A61B 18/18 606/33 |
| 2015/0249389 A1* | 9/2015 | Cummings | ........... | H02M 3/335 363/21.12 |
| 2020/0278733 A1* | 9/2020 | Li | ............................. | G06F 1/28 |
| 2020/0412164 A1* | 12/2020 | Miller | ................. | H02J 7/00712 |

* cited by examiner

*Primary Examiner* — April G Gonzales
(74) *Attorney, Agent, or Firm* — Remenick PLLC

(57) ABSTRACT

Systems and methods using the systems of testing radio frequency receivers include a radio frequency receiver testing device that has a PIN switch adapted to receive a radio transmission, a thermal diode coupled to the PIN switch and controlling the amount of noise within the PIN switch, and a noise diode providing a stable noise source to the radio frequency receiver testing device.

20 Claims, 4 Drawing Sheets

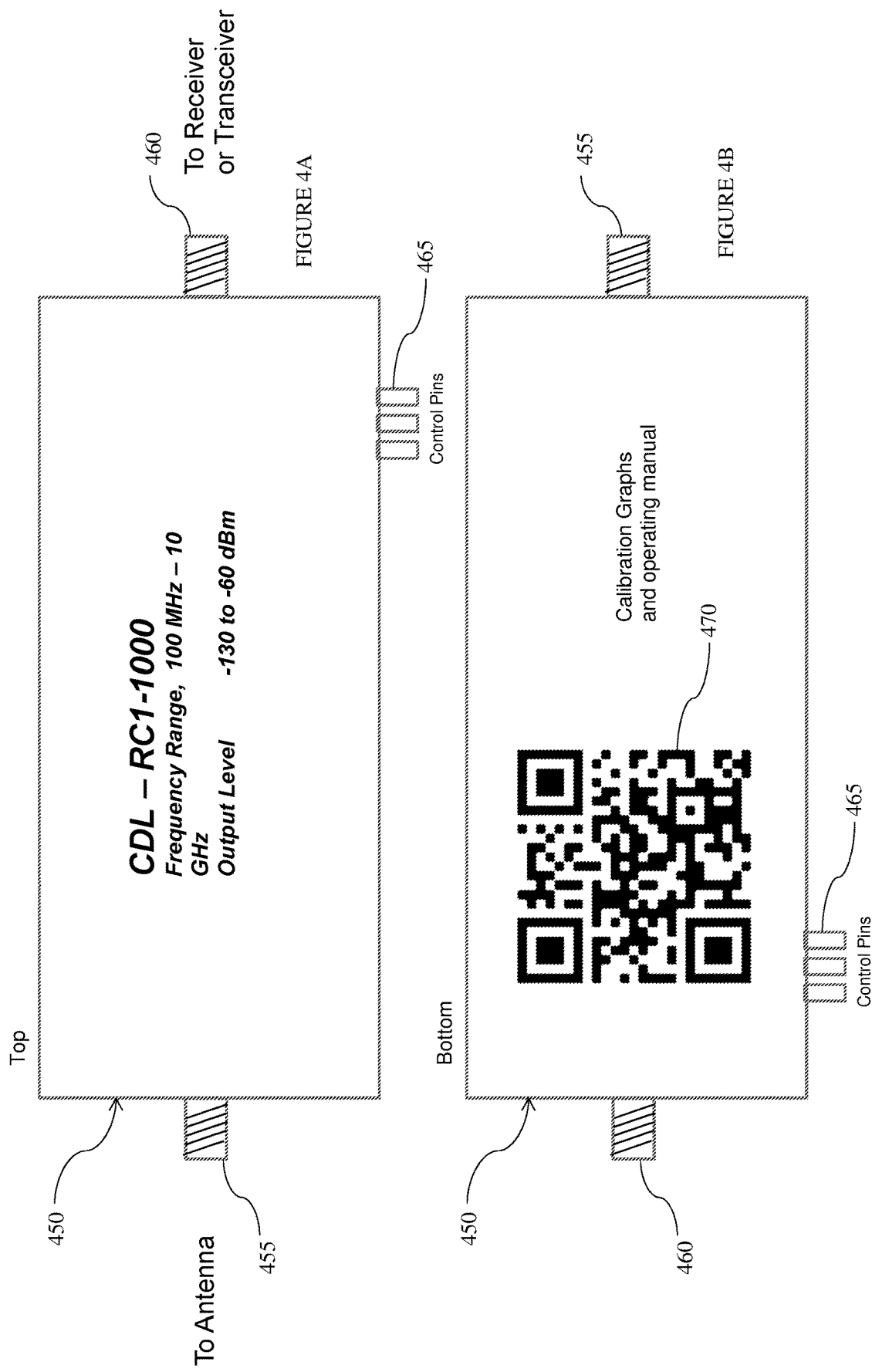

RECEIVER TEST APPARATUS AND METHOD

REFERENCE TO RELATED APPLICATIONS

This application claims priority to U.S. Provisional Application No. 63/352,122, filed Jun. 14, 2022 and entitled "Receiver Test Apparatus and Method," which is hereby specifically and entirely incorporated by reference.

RIGHTS IN THE INVENTION

This invention was made with government support under Cooperative Agreement AST-1519126, between the National Science Foundation and Associated Universities, Inc., and, accordingly, the United States government has certain rights in this invention.

BACKGROUND

1. Field

The invention is directed toward devices for testing receivers. Specifically, the invention is directed toward devices for accurately testing, calibrating, and improving the characteristics of receivers.

2. Background

In numerous fields, such as radio astronomy, telecommunications (including, but not limited to television broadcast systems, radio broadcast systems, cellular systems, short-wave radio systems, satellite systems, internet systems, video capture systems, and other data transmission systems), meteorology, navigation and global positioning, telemetry, etc. use a transmitting device (or transmitter) and a receiving device (or receiver) to relay data wirelessly. In some situations, a device can both transmit and receive data (a transceiver). Typically, the transmitter converts information into radio waves and outputs the radio waves via an antenna for reception by one or more receivers. The receiver is then able to convert the radio waves back to the transmitted data. The information reproduced by the receiver may be in the form of sound, video (television), or digital data.

For example, in radio astronomy, it has been found that receiver calibration is essential for accurate measurements of astrophysical phenomenon. In the 1950s and 60s equipment was developed to obtain accurate calibration using known signal sources and "cold loads." These devices included signal generators, fluorescent bulbs, cryogenically cooled resistors and noise diodes. Today radio astronomers use modern, custom made and radio telescope specific, calibration devices in near real time to calibrate the signals received by the radio telescopes. These devices are used both at the radio telescope and in the development laboratories during the design and construction of the receivers.

There are numerous transmitter testers on the market. These transmitter testers typically test the frequency, modulation, distortion, spectral purity, bandwidth, and other parameters of the transmitter. However, no such devices currently exist for receivers.

Today, with the advent of low noise amplifiers and downstream components, it is essential for designers of receivers used for cellular, government, military, satellite, communications, internet-of-things and many other examples, to understand the attributes of receivers in much better detail than has been available previously.

SUMMARY

The present invention overcomes the problems and disadvantages associated with current strategies and designs and provides new systems and methods of testing radio frequency receivers.

One embodiment is directed to a radio frequency receiver testing device. The device includes a PIN switch adapted to receive a radio transmission, a thermal diode coupled to the PIN switch and controlling the amount of noise within the PIN switch, and a noise diode providing a stable noise source to the radio frequency receiver testing device. Preferably, only one of the thermal diode and the noise diode provides a noise signal to the PIN switch at a time. In a preferred embodiment, the thermal diode is set to cool a particular ohm load. Preferably, the noise diode is adapted to be switched on and off to stabilize the receiver by use of differential measurements of an output synchronously. The radio frequency receiver testing device preferably determines at least one of drift in gain of the receiver, noise floor and noise figure of the receiver, bandwidth getting through the receiver, linearity of the receiver, and stability of the receiver.

The radio frequency receiver testing device preferably further comprises a directional coupler coupled to the PIN switch. In a preferred embodiment, the noise diode is coupled to the directional coupler to provide a stable noise source to the directional coupler. Preferably, the radio frequency receiver testing device further comprises a microcontroller adapted to control components of the radio frequency receiver testing device. Preferably, the microcontroller receives data from the receiver and adjusts the radio frequency receiver testing device in light of the received data. Preferably, the radio frequency receiver testing device is positioned between an antenna and the receiver.

Another embodiment of the invention is directed to a method of testing a radio frequency receiver. The method comprises the steps of coupling a radio frequency receiver testing device to an input of a radio frequency receiver, receiving a known radio frequency signal at the radio frequency receiver testing device, tuning the radio frequency receiver testing device to determine at least one of drift in gain of the receiver, noise floor and noise figure of the receiver, bandwidth getting through the receiver, linearity of the receiver, and stability of the receiver.

The method preferably further comprises adjusting or designing the receiver based on information determined by the radio frequency receiver testing device. Preferably the method further comprises adding amplification or attenuation to the receiver based on information determined by the radio frequency receiver testing device. In a preferred embodiment, the radio frequency receiver testing device is tuned by adjusting at least one noise signal received by the radio frequency receiver testing device. Preferably, the at least one noise signal is produced by one or more of a noise diode and a thermal diode.

The method preferably further comprises at least one of calibrating the gain of the receiver and setting the noise floor of the receiver based on information determined by the radio frequency receiver testing device. In a preferred embodiment, the radio frequency receiver testing device communicates with the receiver and at least one of provides feedback to or adjusts the receiver based on the communications. Preferably, the method further comprises coupling an antenna to a receiving end of the radio frequency receiver testing device. The method preferably further comprises providing a stabilized 50 ohm load and a wide band noise source to the radio frequency receiver testing device.

Other embodiments and advantages of the invention are set forth in part in the description, which follows, and in part, may be obvious from this description, or may be learned from the practice of the invention.

DESCRIPTION OF THE DRAWINGS

The invention is described in greater detail by way of example only and with reference to the attached drawings, in which:

FIGS. 4A-B depict an embodiment of top and bottom faces of an enclosure for a receiver testing device.

DETAILED DESCRIPTION

As embodied and broadly described herein, the disclosures herein provide detailed embodiments of the invention. However, the disclosed embodiments are merely exemplary of the invention that can be embodied in various and alternative forms. Therefore, there is no intent that specific structural and functional details should be limiting, but rather the intention is that they provide a basis for the claims and as a representative basis for teaching one skilled in the art to variously employ the present invention.

A problem in the art capable of being solved by the embodiments of the present invention systems and methods of testing and optimizing receivers. Modern receiver designs are increasingly using improved performance components and have exacting receiver characteristics for use in the cellular, military, government and commercial markets. It is desirable to understand how receivers will operate in multiple environments under increasingly complex spectrum limitations. It has been surprisingly discovered a single device can be used to accurately test the characteristics of a receiver. The device measures, for example, noise floor, dynamic range, gain, bandwidth and linearity of the receiver. The device preferably can be used in the laboratory or built into receivers as standard equipment.

There are preferably two main components in a receiver testing device: a stabilized 50 ohm load and a wide band noise source. These components are used to calibrate a wide variety of attributes of modern receiver design. For example, with these two components it is possible to measure the noise floor, dynamic range, gain, linearity, bandpass characteristics and stability of a receiver quickly and accurately. The testing device is designed for use in the laboratory during development and can also be used in-situ for long term accurate measurements of receiver performance.

The testing device can be used in receivers designed for use in radar, communications and remote sensing. The testing device preferably extends the sensitivity of a receiver and enhances its usefulness. The testing device also preferably serves as built-in test equipment to let an operator know that a receiver is or is not working properly. Preferably the device can be used on existing and future receivers to increase sensitivity and stability. Preferably, the testing device is used for testing radio frequency (RF) and electromagnetic radiation receiving devices, but can be used for testing other types of receiving devices capable of receiving data remotely. Preferably, the testing device is adapted to test radio wave receivers that operate anywhere within the radio frequency spectrum. The testing device may also be used to increase in sensitivity in the receiver calibrating for differential signal reception, allowing for lower signal levels to use effectively in a radio or radar link.

Figure 1:
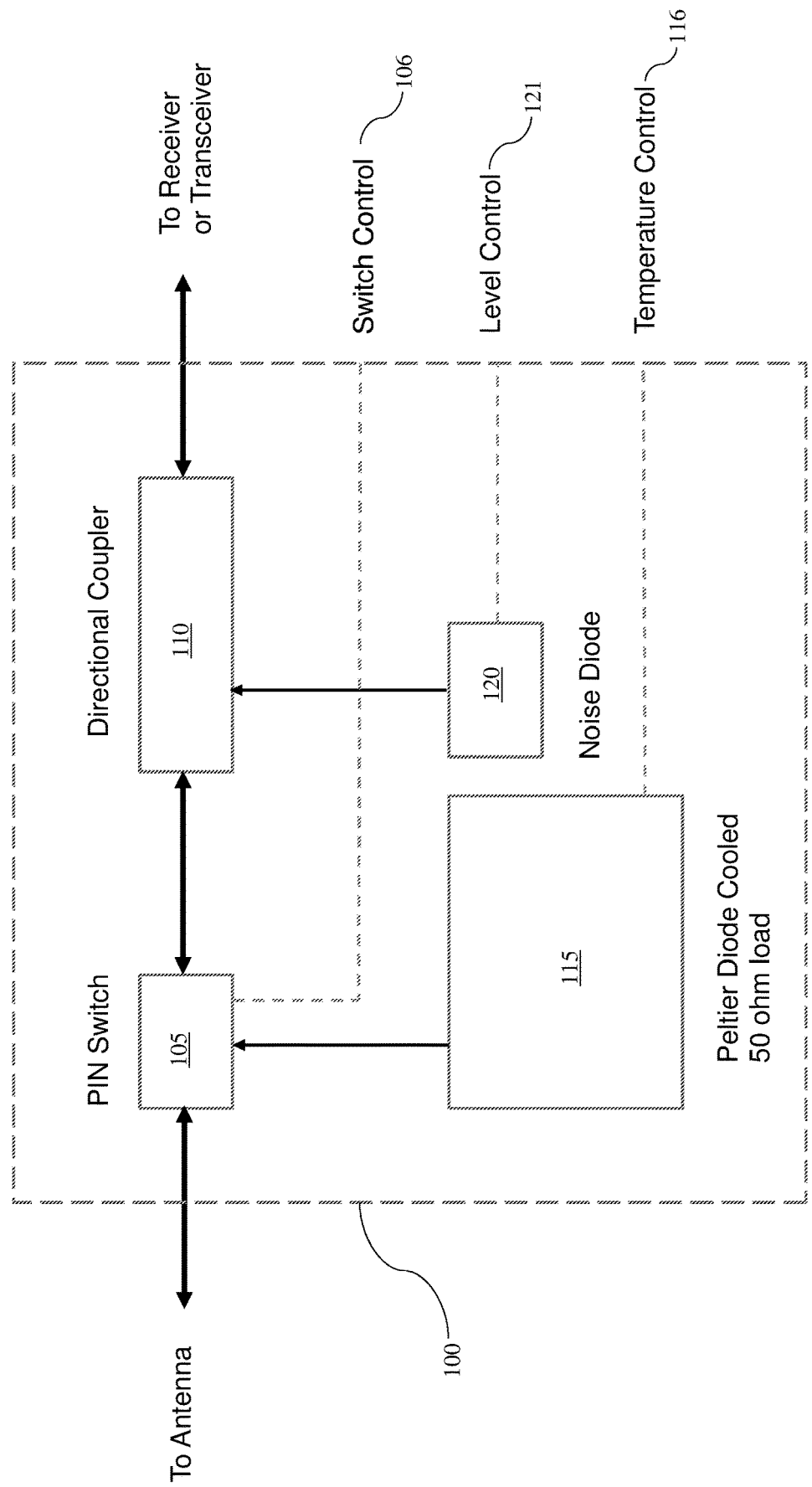
FIG. 1 depicts a first embodiment of a receiver testing device.

FIG. 1 depicts a first embodiment of a schematic of the components of a receiver Testing Device 100. Preferably, Testing Device 100 is preferably communicatively positioned between an antenna and the receiver or transceiver. However, in some embodiments, the antenna is not necessary and Testing Device 100 can receive the input directly. The received signal comes into Testing Device 100 at PIN Switch 105. PIN Switch 105 is a relay that allows the incoming signal to be routed to Directional Coupler 110. When a PIN Switch is forward biased it allows RF energy to flow, and when reverse biased it blocks RF energy. The level of noise experienced by PIN Switch 105 is controlled by Peltier Diode (or Thermal Diode) 115. Peltier Diode 115 preferably changes the voltage received by PIN Switch 105 linearly according to temperature. As the temperature increases, the forward voltage of Peltier Diode 115 decreases. Preferably, Peltier Diode 115 is set to cool a particular 50 ohm load.

Directional Coupler 110 is a measurement device that measures both the RF power from the source to the load (the forward component) as well as the reflected component, for example, the power reflected back from the load to the source. Knowing the forward and reflected components permits the computation of total power, return loss, and standing wave ratio of the load. Noise Diode 120 can be switched in and out to provide a stable noise source to Directional Coupler 110. Preferably, Directional Coupler 110 is a no loss device and allows the user to determine which parameter is being measured and the type of gain in the receiver.

Preferably, Testing Device 100 has three points of user control. Preferably, Switch Control 106 allows a user to adjust PIN Switch 105; Temperature Control 116 allows a user to control the temperature of Peltier Diode 115; and Level Control 121 allows a user to set Noise Diode 120. The three control points are preferably data input ports. By properly tuning Testing Device 100 with the control points, a user can determine drift in gain of the receiver, the noise floor and noise figure of the receiver, the bandwidth getting through the receiver, and other parameters of the receiver. Additionally, linearity of the receiver response can be tested, which critical for certain applications such as radar and radio astronomy. By knowing the transmission the receiver is supposed to receive and comparing them to the data of the received transmission, a user is able to determine the state of the receiver and make any necessary adjustments to improve the receiver. For example, the internal sections of the receiver can be adjusted or optimally designed to best embody the lowest noise performance, most applicable bandwidth, and/or best linearity. For instance, adding amplification or attenuation to the receiver to best match its designed application.

Testing Device 100 can also be used to calibrate the gain of the receiver and set the noise floor, thereby improving the sensitivity of the receiver. This is done by measuring the output of the receiver with a known input power. Receivers typically have around 80-110 dB of gain that translates low level input signals to high level signals to drive speakers or all use in digital implementations. Additionally, the device in combination with multiple correlation receivers can be used to diminish the noise floor.

Figure 2:
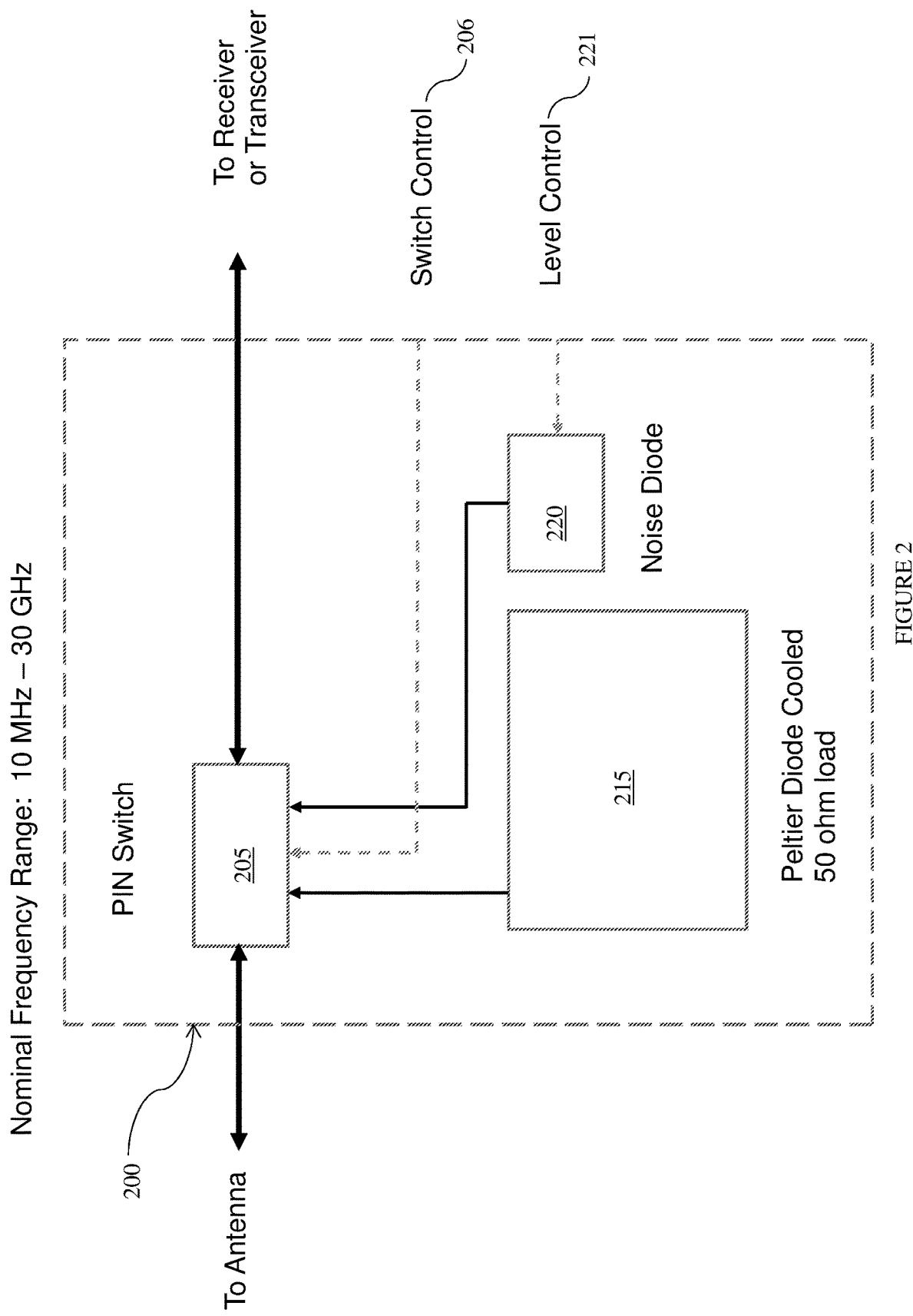
FIG. 2 depicts a second embodiment of a receiver testing device without optional components.

FIG. 2 depicts a second embodiment of a schematic of the components of a receiver Testing Device 200. Testing Device 200 is similar to testing device 100 of FIG. 1 (with similar element numbers being similar elements), except Testing Device 200 does not have certain optional components. Preferably, Testing Device 200 is communicatively positioned between an antenna and the receiver or transceiver. However, in some embodiments, the antenna is not necessary and Testing Device 200 can receive the input directly. The received signal comes into Testing Device 200 at PIN Switch 205 and then is routed to the receiver without a directional coupler. The level of noise experienced by PIN Switch 205 is controlled by Peltier Diode (or Thermal Diode) 215. Peltier Diode 215 preferably changes the voltage received by PIN Switch 205 linearly according to temperature. As the temperature increases, the forward voltage of Peltier Diode 215 decreases. Preferably, Peltier Diode 215 is set to cool a particular 50 ohm load. Noise Diode 220 can be switched in and out to provide a stable noise source to PIN Switch 205. Preferably, only one noise source is used at a time. The switching on/off of the noise source preferably allows for stabilization of the receiver by use of differential measurements of the output synchronously (also known as a Dicke receiver setup).

Preferably, Testing Device 200 has two points of user control. Preferably, Switch Control 206 allows a user to adjust PIN Switch 205 and Level Control 221 allows a user to set Noise Diode 220. The two control points are preferably data input ports. By properly tuning Testing Device 200 with the control points, a user can determine drift in gain of the receiver, the noise floor and noise figure of the receiver, the bandwidth getting through the receiver, linearity, stability, and other parameters of the receiver. By knowing the transmission the receiver is supposed to receive and comparing them to the data of the received transmission, a user is able to determine the state of the receiver and make any necessary adjustments to improve the receiver. For example, the internal sections of the receiver can be adjusted or optimally designed to best embody the lowest noise performance, most applicable bandwidth, and/or best linearity. For instance, adding amplification or attenuation to the receiver to best match its designed application.

Testing Device 200 can also be used to calibrate the gain of the receiver and set the noise floor, thereby improving the sensitivity of the receiver. This is done by measuring the output of the receiver with a known input power. Receivers typically have around 80-110 dB of gain that translates low level input signals to high level signals to drive speakers or all use in digital implementations. Additionally, the device in combination with multiple correlation receivers can be used to diminish the noise floor.

Figure 3:
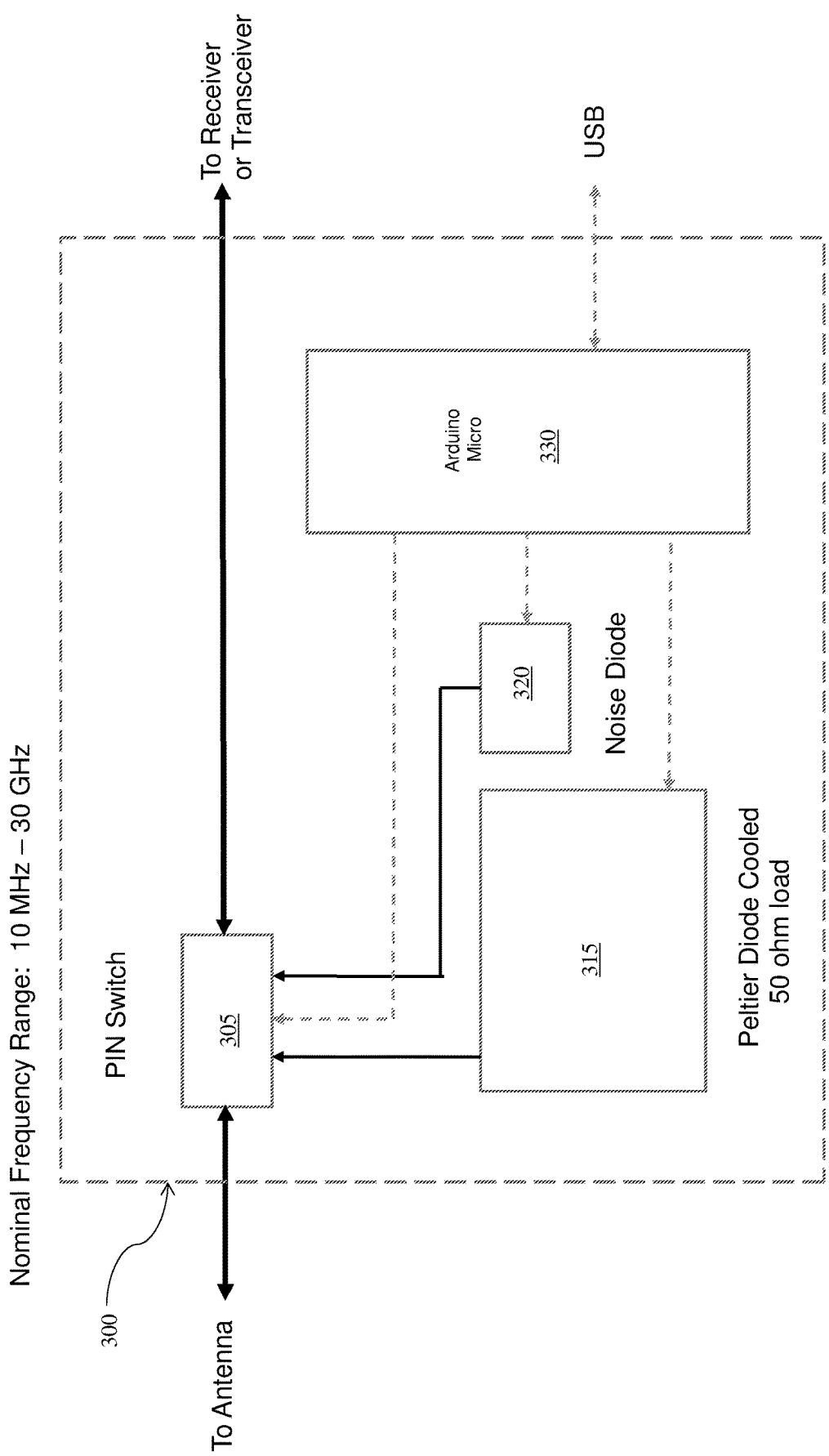
FIG. 3 depicts a third embodiment of a receiver testing device with additional optional components.

FIG. 3 depicts a third embodiment of a schematic of the components of a receiver Testing Device 300. Testing Device 300 is similar to testing device 100 of FIG. 1 (with similar element numbers being similar elements), except Testing Device 300 certain additional optional components. Preferably, Testing Device 300 is preferably communicatively positioned between an antenna and the receiver or transceiver. However, in some embodiments, the antenna is not necessary and Testing Device 300 can receive the input directly. The received signal comes into Testing Device 300 at PIN Switch 305 and then is routed to the receiver without a directional coupler. The level of noise experienced by PIN Switch 305 is controlled by Peltier Diode (or Thermal Diode) 315. Peltier Diode 315 preferably changes the voltage received by PIN Switch 305 linearly according to temperature. As the temperature increases, the forward voltage of Peltier Diode 315 decreases. Preferably, Peltier Diode 315 is set to cool a particular 50 ohm load. Noise Diode 320 can be switched in and out to provide a stable noise source to PIN Switch 305.

Preferably, Testing Device 300 is controlled by a Microcontroller 330. Microcontroller 330 can be a single-chip microcontroller, a single-board microcontroller (i.e. an Arduino device or a Raspberry Pi device), or another device capable of controlling the components of Testing Device 300. Microcontroller 330 may interface with a computer through a USB or other data port, may be capable of wireless communication with a handheld device (i.e. a smartphone), or may have an on-board interface (i.e. through a touch screen), or combinations thereof. Microcontroller 330 may also be capable of communicating with the receiver and providing feedback or adjusting the receiver based on the communications. By properly tuning Testing Device 300 microcontroller 330 can determine drift in gain of the receiver, the noise floor and noise figure of the receiver, the bandwidth getting through the receiver, and other parameters of the receiver. Additionally, linearity of the receiver response can be tested, which critical for certain applications such as radar and radio astronomy. By knowing the transmission the receiver is supposed to receive and comparing them to the data of the received transmission, a user is able to determine the state of the receiver and make any necessary adjustments to improve the receiver. For example, the internal sections of the receiver can be adjusted or optimally designed to best embody the lowest noise performance, most applicable bandwidth, and/or best linearity. For instance, adding amplification or attenuation to the receiver to best match its designed application.

Testing Device 300 can also be used to calibrate the gain of the receiver and set the noise floor, thereby improving the sensitivity of the receiver. This is done by measuring the output of the receiver with a known input power. Receivers typically have around 80-110 dB of gain that translates low level input signals to high level signals to drive speakers or all use in digital implementations. Additionally, the device in combination with multiple correlation receivers can be used to diminish the noise floor.

FIGS. 4A and 4B depict an embodiment of a housing 450 for a receiver testing device, with 4A depicting the top and 4B depicting the bottom. One end of housing 450 has a coupling 455 for connecting to an antenna and the other end has a coupling 460 for connecting to a receiver or transceiver. In embodiments with external controls, housing 450 may have one or more control pins 465. Housing 450 may also have instructions or information directing a user to instructions on how to use the testing device. For example, housing 450 may have a QR Code 470 or a website printed on the surface of the housing 450.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A radio frequency receiver testing device, comprising:
a PIN switch adapted to receive a radio transmission;
a thermal diode coupled to the PIN switch and controlling the amount of noise within the PIN switch; and
a noise diode providing a stable noise source to the radio frequency receiver testing device.

2. The radio frequency receiver testing device of claim 1, wherein only one of the thermal diode and the noise diode provides a noise signal to the PIN switch at a time.

3. The radio frequency receiver testing device of claim 1, wherein the thermal diode is set to cool a particular 50 ohm load.

4. The radio frequency receiver testing device of claim 1, wherein the noise diode is adapted to be switched on and off to stabilize the receiver by use of differential measurements of an output synchronously.

5. The radio frequency receiver testing device of claim 1, wherein the radio frequency receiver testing device determines at least one of drift in gain of the receiver, noise floor and noise figure of the receiver, bandwidth getting through the receiver, linearity of the receiver, and stability of the receiver.

6. The radio frequency receiver testing device of claim 1, further comprising a directional coupler coupled to the PIN switch.

7. The radio frequency receiver testing device of claim 6, wherein the noise diode is coupled to the directional coupler to provide a stable noise source to the directional coupler.

8. The radio frequency receiver testing device of claim 1, further comprising a microcontroller adapted to control components of the radio frequency receiver testing device.

9. The radio frequency receiver testing device of claim 8, wherein the microcontroller receives data from the receiver and adjusts the radio frequency receiver testing device in light of the received data.

10. The radio frequency receiver testing device of claim 1, wherein the radio frequency receiver testing device is positioned between an antenna and the receiver.

11. The method of claim 1, wherein the radio frequency receiver testing device is the radio frequency receiver testing device of claim 1.

12. A method of testing a radio frequency receiver, comprising the steps of:
coupling a radio frequency receiver testing device to an input of a radio frequency receiver;
receiving a known radio frequency signal at the radio frequency receiver testing device;
tuning the radio frequency receiver testing device to determine at least one of drift in gain of the receiver, noise floor and noise figure of the receiver, bandwidth getting through the receiver, linearity of the receiver, and stability of the receiver.

13. The method of claim 12, further comprising adjusting or designing the receiver based on information determined by the radio frequency receiver testing device.

14. The method of claim 13, further comprising adding amplification or attenuation to the receiver based on information determined by the radio frequency receiver testing device.

15. The method of claim 12, wherein the radio frequency receiver testing device is tuned by adjusting at least one noise signal received by the radio frequency receiver testing device.

16. The method of claim 15, wherein the at least one noise signal is produced by one or more of a noise diode and a thermal diode.

17. The method of claim 12, further comprising at least one of calibrating the gain of the receiver and setting the noise floor of the receiver based on information determined by the radio frequency receiver testing device.

18. The method of claim 12, wherein the radio frequency receiver testing device communicates with the receiver and at least one of provides feedback to or adjusts the receiver based on the communications.

19. The method of claim 12, further comprising coupling an antenna to a receiving end of the radio frequency receiver testing device.

20. The method of claim 12, further comprising providing a stabilized 50 ohm load and a wide band noise source to the radio frequency receiver testing device.

* * * * *